(12) United States Patent
Gervais et al.

(10) Patent No.: US 12,182,265 B2
(45) Date of Patent: *Dec. 31, 2024

(54) SYSTEM AND METHOD FOR CLOUD-BASED OPERATING SYSTEM EVENT AND DATA ACCESS MONITORING

(71) Applicant: F5, Inc., Seattle, WA (US)

(72) Inventors: Christopher Gervais, Westwood, MA (US); Sean T. Reed, Seattle, WA (US); Nicholas S. Goodwin, Everett, MA (US); Joseph D. Baker, Burlington, MA (US); Samuel Bisbee-vonKaufmann, Braintree, MA (US); Nathan D. Cooprider, Bedford, MA (US); David C. Hagman, Tewksbury, MA (US); Lucas M. Dubois, Dorchester, MA (US); Jennifer A. Andre, Somerville, MA (US)

(73) Assignee: F5, Inc., Seattle, WA (US)

( * ) Notice: Subject to any disclaimer, the term of this patent is extended or adjusted under 35 U.S.C. 154(b) by 257 days.

This patent is subject to a terminal disclaimer.

(21) Appl. No.: 17/667,383

(22) Filed: Feb. 8, 2022

(65) Prior Publication Data

US 2023/0252147 A1 Aug. 10, 2023
US 2024/0152612 A9 May 9, 2024

Related U.S. Application Data

(63) Continuation of application No. 17/007,400, filed on Aug. 31, 2020, now Pat. No. 11,283,822, which is a
(Continued)

(51) Int. Cl.
*H04L 29/06* (2006.01)
*G06F 21/56* (2013.01)

(52) U.S. Cl.
CPC ...... *G06F 21/566* (2013.01); *G06F 2221/034* (2013.01)

(58) Field of Classification Search
CPC .. G06F 21/56; G06F 21/566; G06F 2221/034; G06F 2221/03
(Continued)

(56) References Cited

U.S. PATENT DOCUMENTS 10,931,699 B2 * 2/2021 Wolff ..................... G06F 21/566
11,283,822 B2 * 3/2022 Gervais ................. G06F 21/552
(Continued)

FOREIGN PATENT DOCUMENTS

WO 2016018382 A1 2/2016

OTHER PUBLICATIONS

CN Application No. 201780085458.3, First Office Action, dated Oct. 10, 2022.
(Continued)

*Primary Examiner* — Bharat Barot
(74) *Attorney, Agent, or Firm* — Troutman Pepper Hamilton Sanders LLP

(57) ABSTRACT

A cloud-based operating-system-event and data-access monitoring method includes collecting event information from a monitored cloud-based element. One or more structured event payloads based on the event information is then generated. The structured event payloads that produce one or more validated event collections are then validated. The one or more validated event collections are then serialized and filtered to remove redundant structured event payload data. The filtered validated structured event payloads are then de-serialized to produce a time-sequenced, ordered event stream. The time-sequenced, ordered event stream is de-duplicated to remove duplicate structured event payloads.

(Continued)

The time-sequenced ordered event stream is then processed to generate processed information security results.

20 Claims, 7 Drawing Sheets

Related U.S. Application Data continuation of application No. 15/846,780, filed on Dec. 19, 2017, now Pat. No. 10,791,134.

(60) Provisional application No. 62/437,411, filed on Dec. 21, 2016.

(58) Field of Classification Search
USPC .............................................. 726/1–2, 22–23
See application file for complete search history.

(56) References Cited

U.S. PATENT DOCUMENTS

| | | | | |
|---|---|---|---|---|
| 11,610,001 | B2 * | 3/2023 | Norden | G06F 21/554 |
| 11,809,574 | B2 * | 11/2023 | DuBois | G06F 21/566 |
| 2012/0297061 | A1 | 11/2012 | Pedigo et al. | |
| 2014/0330926 | A1 | 11/2014 | Nano et al. | |
| 2015/0264077 | A1 | 9/2015 | Berger et al. | |
| 2016/0226944 | A1 | 8/2016 | Hsiao et al. | |

OTHER PUBLICATIONS

Chinese Application for Invention No. 201780085458.3, Second Office Action, dated May 26, 2023.
Europe Patent Application No. 23200168.5, Extended European Search Report, dated Dec. 22, 2023.

* cited by examiner

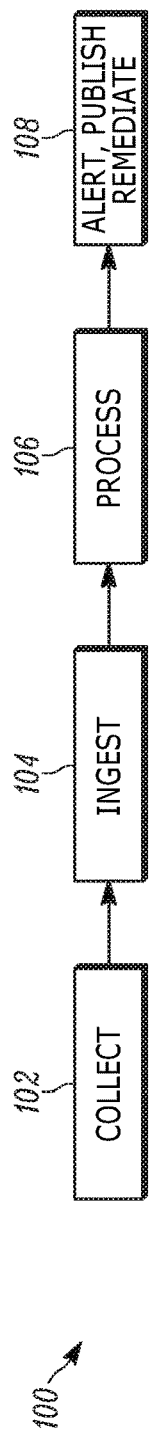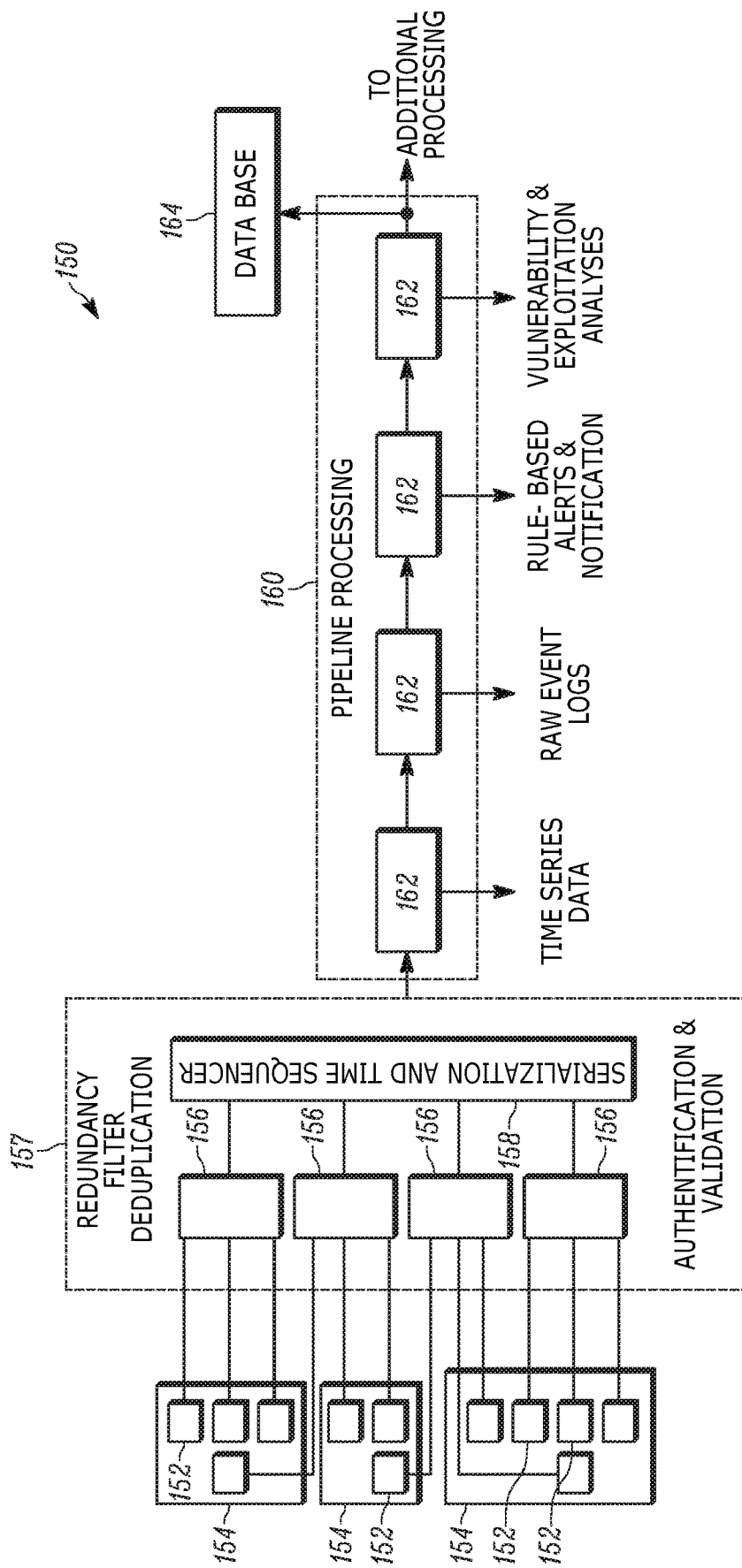

Server Activity 320,629
21
02/11 07.00 PM — 02/12 07.00 PM 320,629
21
03/11 08.00 PM — 02/12 07.00 PM

Server statistics

10 Monitored Servers
25 EC2 Instances
40%

Hosts

User Activity

| | |
|---|---|
| File Transfers | 100% |
| Privilege Escalations | 33% / 34% / 33% |
| Suspicious Commands | 82% / 15% |
| Package Installs | 100% |

Active Login Sessions

| USER | SOURCE IP | AGENT | LOGIN TIME | DURATION |
|---|---|---|---|---|
| Ubuntu (1006) | 204.148.75.54 | Jumphost | 02/12/16 17:32:16 | 2:15:41 |

RULESETS (7)

AUDIT LOGS

SETTINGS

FIG. 6B

SYSTEM AND METHOD FOR CLOUD-BASED OPERATING SYSTEM EVENT AND DATA ACCESS MONITORING

CROSS REFERENCE TO RELATED APPLICATION

This application is a continuation of U.S. patent application Ser. No. 17/007,400, filed Aug. 31, 2020, and which is a continuation of U.S. patent application Ser. No. 15/846,780, filed on Dec. 19, 2017 (now U.S. Pat. No. 10,791,134, issued Sep. 20, 2020), which claims benefit of U.S. Provisional Patent Application Ser. No. 62/437,411, filed on Dec. 21, 2016. The entire content of U.S. patent application Ser. No. 15/846,780 and U.S. Provisional Patent Application Ser. No. 62/437,411 are herein incorporated by reference.

The section headings used herein are for organizational purposes only and should not to be construed as limiting the subject matter described in the present application in any way.

INTRODUCTION

The movement of data and software applications to the cloud has fundamentally changed the way that computer systems provide software applications and services to users. For example, the network edge of traditional enterprise networks has been replaced by a virtual perimeter, thus changing the way that computers process information and the way that data are accessed by computers. As a result, the ingress and egress point where hardware security appliances and network visibility devices have traditionally been deployed has been eliminated. Not only is the basic processing architecture different in the cloud, the scale and growth models of processes, applications, and services are very different. Cloud-based computer system resources can grow and shrink on very rapid time scales. Also, cloud-based computer systems are generally highly distributed so tracking and correctly sequencing events is significantly more challenging. Furthermore, security and vulnerability threat models are also necessarily different in cloud-based computer systems as compared to fixed-infrastructure enterprise networks. Consequently, new methods and systems are needed to monitor and protect networked information and systems that run on the cloud. Said another way, new monitoring and security systems and methods are now required for the cloud that are built specifically for cloud-based information systems.

Many applications, including credit card processing, financial transactions, corporate governance, content delivery, health care, and enterprise network security require monitoring and protecting digital data as well as assurance regarding the integrity of processing that data. Compliance with regulations, reporting and standards, such as Payment Card Industry Data Security Standard (PCI DSS), Health Insurance Portability and Accountability Act (HIPAA), Service Organization Controls (SOC), International Organization for Standardization standards for information security management (ISO 27001), Digital Rights Management (DRM), and Sarbanes-Oxley (SOX) all demand careful and traceable accountability of data as well as convenient data processing and access to data.

BRIEF DESCRIPTION OF THE DRAWINGS

The present teaching, in accordance with preferred and exemplary embodiments, together with further advantages thereof, is more particularly described in the following detailed description, taken in conjunction with the accompanying drawings. The skilled person in the art will understand that the drawings, described below, are for illustration purposes only. The drawings are not necessarily to scale, emphasis instead generally being placed upon illustrating principles of the teaching. The drawings are not intended to limit the scope of the Applicant's teaching in any way.

FIG. 1A illustrates a high-level process flow diagram of an embodiment of an operating system event and data access monitoring method of the present teaching.

FIG. 1B illustrates a system block diagram that implements the high-level process flow diagram described in connection with FIG. 1A of the operating system event and data access monitoring method of the present teaching.

FIGS. 6A and 6B illustrate an embodiment of a graphical user interface (GUI) presenting results provided by an operating system event and data access monitoring system and method of the present teaching.

DESCRIPTION OF VARIOUS EMBODIMENTS

Figure 2:
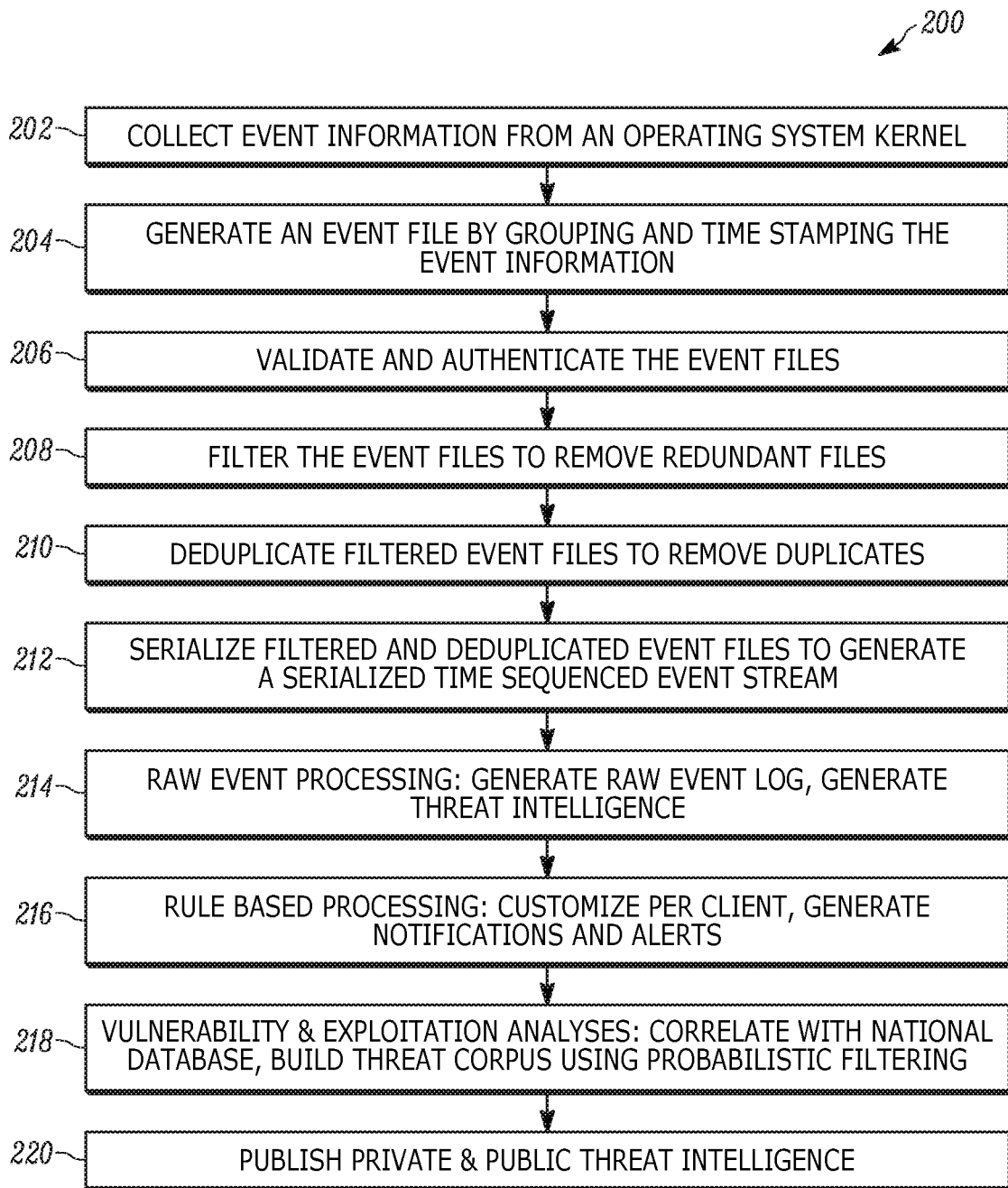
FIG. 2 illustrates a process flow diagram of an embodiment of the operating system event and data access monitoring method of the present teaching.

The present teaching will now be described in more detail with reference to exemplary embodiments thereof as shown in the accompanying drawings. While the present teachings are described in conjunction with various embodiments and examples, it is not intended that the present teachings be limited to such embodiments. On the contrary, the present teachings encompass various alternatives, modifications and equivalents, as will be appreciated by those of skill in the art. Those of ordinary skill in the art having access to the teaching herein will recognize additional implementations, modifications, and embodiments, as well as other fields of use, which are within the scope of the present disclosure as described herein.

Reference in the specification to "one embodiment" or "an embodiment" means that a particular feature, structure, or characteristic described in connection with the embodiment is included in at least one embodiment of the teaching. The appearances of the phrase "in one embodiment" in various places in the specification are not necessarily all referring to the same embodiment.

It should be understood that the individual steps of the methods of the present teachings can be performed in any order and/or simultaneously as long as the teaching remains operable. Furthermore, it should be understood that the apparatus and methods of the present teachings can include any number or all of the described embodiments as long as the teaching remains operable.

Many cloud-based systems require methods and systems for monitoring and securely processing data in distributed systems. In particular, many cloud-based systems require: (1) tracking of the time sequence of events over both longand short-duration periods from a known authoritative source; (2) tracking users; (3) tracking access to file systems based on roles and/or individual users; and (4) maintaining a repository of all instances of particular applications, systems or processes as they migrate across virtual resources in the cloud. The operating system event and data access monitoring system and method of the present teaching addresses these growing requirements for security and monitoring of cloud-based applications and systems. The cloud-native monitoring suite of applications of the present teaching can run on any computing platform, including virtual machines, servers, desktop, laptop and handheld devices. The computing platforms that execute the system and method of the present teaching may be dedicated or shared. The operating system event and data access monitoring system and method of the present teaching identifies insider threats, external attacks, data loss and ensures compliance to a large number of information security and data handling regulations and standards.

The term "element" as used herein generally refers to hardware, software and combinations of hardware and software. For example a cloud-based element can refer to only software that is running on cloud-based hardware. A cloud-based element can also refer to a hardware device that is located in the cloud. A cloud-based element can also refer to both software and the hardware computing device on which the software is running. Software, as used here in refers to a collection of executable code that provides processes, applications and/or services.

One feature of the system and method for operating system event and data access monitoring of the present teaching is that it provides a cloud-native (i.e. designed specifically for the cloud), platform-independent, comprehensive set of security applications. The results of the method and outputs of the system of the present teaching can provide synthesized and contextualized data to users. The results and outputs aide remediation of cyber threats across a broad spectrum of activities because it can support a comprehensive set of known security applications. One feature of the system of the present teaching is that it utilizes processing assets distributed in a cloud-based computing architecture in a cost-effective manor. As a result, the system scales in a cost-effective, modular fashion as the monitored information systems grow. This is, at least in part, because the system relies on cloud-based processing resources that can be expanded as the information system demand expands, and reduced when the information system demand wanes. The system also easily accommodates addition of new security threats and new monitoring applications by supporting a configurable and software-application-based monitoring approach. This is contrasted to prior art systems where individual point solutions for security and monitoring require specialized, costly, hardware and provide a smaller suite of security applications.

FIG. 1A provides a high-level process flow diagram 100 of the operating system event and data access monitoring method of the present teaching. The first step 102 of the method collects event information from the processing activities ongoing in a distributed information processing environment of a monitored information system. The event information is tied to specific users, and also carefully time-tagged and formatted to preserve timing information. The second step 104 is for the collected information to be ingested at one or more ingestion processors. The ingested information is then filtered, de-duplicated, and serialized in a time sequencer to produce a stream of raw event data. In some embodiments, the collected information is real-time continuous event information and the stream of raw data is a real-time event stream. The third step 106 is to process the raw event data. The processing in the third step 106 produces various results. The fourth step 108 provides these results, which are referred to as synthesized data. The results may be provided directly, or later assembled, in various forms for distribution, for example, alerts, notifications, reports, remediation recommendations, and other results. The results are made available, for example, to customers, system administrators, public and private security reporting venues, and to other users.

FIG. 1B is a system block diagram 150 that implements the high-level process flow diagram 100 described in connection with FIG. 1A of the operating system event and data access monitoring method of the present teaching. One or more elements 152, which are located in one or more network domains 154, are connected to receive elements 156 that comprise the input stage of an ingestion processor 157. The elements 152 generate event information that is collected and sent to the ingestion processor 157. In some embodiments, the event information comprises events of particular pre-defined type and metadata. In some embodiments, the event information is real-time continuously generated event information produced by a cloud-based process or machine. In some embodiments, the event information is time stamped based on the time the event occurred. The event information is assembled into a structured event payload in a pre-determined format and sent to the ingestion processor 157.

The receive elements 156 authenticate and validate the event information provided to the receive elements 156 from elements 152. In some embodiments, the validated structured event payloads that remain post authentication and validation are referred to as validated event collections. The outputs of the receive element 156 are connected to a serialization element 158. In some embodiments the serialization element 158 produces a serialized, time-sequenced raw event data stream. In some embodiments, the event information is collected continuously in real time and the time-sequenced raw event data stream is a real-time event stream. The output of the serialization element 158 is connected to a pipeline processor 160. The pipeline processor 160 comprises a series of processing elements 162 that produce specific processed data and synthesized information that are derived from the time-sequenced raw event data. One advantage of the pipeline processor architecture of the present teaching is that the processing elements 162 may be applied in any order, because the output of each pipeline stage is time-sequenced raw event data. In some embodiments, the processing elements 162 pass the same time-sequenced raw event data to the next element in the pipeline. Also, in some embodiments, the processing elements 162 refine the time-sequenced raw event data before passing it to the next stage.

In some embodiments, the pipeline processor 160 comprises a time series data processing engine that produces a stream of time-correlated events. In some embodiments, the time-series data processing engine time stamps the time-correlated event data with the time that it is persisted in memory. The system differentiates between the time that the event occurred on the cloud-based element and the time the event data is persisted in memory. These two time stamps must be separately tracked and integrated together to provide a functional time-correlated event management system that provides accurate real-time and post-processed time-sensitive data analysis. Also, in some embodiments, the pipeline processor 160 comprises a raw-event logging engine that produces raw event logs. Also, in some embodiments, the pipeline processor 160 comprises a rule-based event identification engine. The rule-based event identification engine flags events that satisfy customizable rules to produce alerts and notifications based on the customized rule set. In addition, in some embodiments, the pipeline processor 160 comprises any of a variety of vulnerability and exploitation analysis engines. For example, a vulnerability and exploitation analysis engine can be used to correlate the time-sequenced raw event data to known databases of security threats and vulnerabilities. The correlation can be performed in numerous ways, such as by using a probabilistic filter. Probabilistic filters are known in the art to be an efficient filter that works on a probabilistic data set to determine whether an element is a member of a set. The time-sequenced raw event stream is archived in a database 164. In some embodiments, a time stamp or a series of time stamp is applied to track the time that the time-sequenced raw event stream is archived in the database 164. The time-sequenced raw event stream output from the pipeline processor may also be made available to additional downstream processing.

In some embodiments, the ingestion processor 157 and the pipeline processor comprise cloud-based elements that are distributed in location and connected together using the Internet. For example, the elements 152 can be cloud-based elements connected to the ingestion processor through the Internet. In some embodiments, the elements 152 reside in public or private cloud infrastructure. Also, in some embodiments, the ingestion processor 157 and the pipeline processor 160 comprise elements that reside in public or private cloud infrastructure. Also, in some embodiments, the elements 152 reside in servers located at various customer premises. Also, in some embodiments, the ingestion processor 157 and the pipeline processor 160 comprise elements that reside in servers located at various customer premises.

The elements 152 may utilize an operating system with a kernel. In these embodiments, the operating systems may be the same type operating system or may be different types of operating systems. Some specific embodiments of the method and system of the present teaching utilize Linux operating systems. One skilled in the art will appreciate that the operating system is not limited to Linux. In various embodiments, various operating systems, and/or combinations of operating systems may be utilized. It should be understood that the operating system may be a virtual machine or the operating system may run on dedicated hardware.

FIG. 2 illustrates a process flow diagram 200 of an embodiment of the operating system event and data access monitoring method of the present teaching. In a first step 202 of the method 200, event information is received from an element being monitored. The event information may comprise events and information about the events that can be used to generate metadata associated with the event. In some embodiments, the event information is derived from an operating system kernel. In some embodiments, the event information is collected continuously in real time.

In a second step 204 of the method 200, a structured event payload is generated from the event information obtained in the first 202. In some embodiments, the structured event payload is a grouped and time-stamped collection of the events obtained in the first step 202. In some embodiments, the structured event payload includes metadata derived from the event information. In some embodiments, structured event payloads are written any time a particular system call happens, whether that be unlink (remove a link) or getpid (get process identification).

The system of the present teaching makes efficient use of resources because it uses a unique parsing model during the creation of the structured event payload. The parsing model of the present teaching groups related event types together. The parsing model correlates event types to determine those that are related in real-time as the file is assembled. This is in contrast to prior art systems which provide a syslog output with many different lines across disparate events, which must then be later correlated. The structured event payloads are output in a JavaScript Object Notification (JSON) format that is relatively simple to read and parse. This is in contrast to prior art systems which provide a key-value format that is more process intensive to parse, and presents values encoded into hex randomly.

In the third step 206 of the method 200, the structured event payloads are validated. In some embodiments, the validation step 206 includes authenticating the particular process or machine identifier (ID) and the user ID of the event. In some embodiments, the validated structured event payloads form a validated event collection. The validated event collection is serialized into a real-time event stream for transmission for processing. The fourth step 208 of the method 200 includes filtering the validated event collections to remove redundant structured event payloads. In some embodiments, a de-serializing step (not shown in FIG. 2) follows the filtering step four 208. The de-serializing step produces a time-sequenced, ordered event stream that continues on to the next step of the method. The time-sequenced, ordered event stream is suitable for post-processing in a distributed computing environment.

In a fifth step 210 of the method 200, the outputs from the fourth step 208 of the method 200 are de-duplicated. In some embodiments, the outputs are filtered event collections. In some embodiments, the outputs are time-sequenced, ordered event streams. The de-duplication step 210 of the method 200 can use any one of many de-duplication processes known in the art. De-duplication eliminates duplicate copies of repeating data by comparing stored chunks of data with the same size chunk of new incoming data, and removing any chunks that match.

In a sixth step 212 of the method 200, the de-duplicated data is then serialized. In some embodiments, serialization in the sixth step 212 comprises producing a time sequenced raw event stream. That is, the raw event stream is provided at the output of the sixth step 212 in an order that substantially represents the time sequence of the original event activities. That is, events that happened first in time appear first in the time-sequenced raw event stream. Events that happened second in time appear second in the time-sequenced raw event stream, and so forth.

In a seventh step 214, an eighth step 216, and a ninth step 218 of the method 200, the time-sequenced raw event stream from the sixth step 212 is then processed. In various methods according to the present teaching some of all of these steps are performed in various orders. In some embodiments, the process step seven 214 is processing the time-sequenced, ordered event stream for real-time signal detection using individual event analysis on the collected event information to generate processed information security results. In some embodiments, the process step seven 214 is raw event processing that produces a raw event log that may be used to generate threat intelligence. In some embodiments, the process step eight 216 is rule-based processing. In rule based processing, customer-specific rules are applied to the time-sequenced raw data event stream to produce alerts and notifications to that customer. Multiple customer rule sets may be applied, and thus customized notifications and alerts may be provided to individual customers.

In some embodiments, the process step nine 218 includes data analysis processing. The data analysis may comprise vulnerability analysis. For example, vulnerability analysis may catalog the assets and capabilities of a particular monitored system, prioritize those assets, and identify specific vulnerabilities of and potential threats posed to those assets based on the processed time-sequenced raw event data. The data analysis may also comprise an exploitation analysis. In exploitation analysis processing, the time-sequenced raw data event stream identifies various processes and activities that are subject to cyber exploitation. In some embodiments of processing step nine 218, the processor builds a threat corpus using probabilistic filtering. Also, in some embodiments of processing step nine 218, the processor correlates data with national databases of known security threats to identify vulnerabilities and exploitations. In some embodiments of processing step nine 218, the processor determines whether the events represent a known threat pattern by using a probabilistic filter. The use of a probabilistic filter is particularly advantageous in cases where there are a large number of events since for large numbers of events, a deterministic method of establishing whether an event is a member of a threat pattern is impractical.

One feature of the method of the present teaching is that the step 214, 216, and 218 of the method 200 can be performed in a pipeline fashion. That is, the input and one output of the processing steps 214, 216, and 218 is a time-sequenced raw event stream. As such, the processing steps 214, 216, and 218 may be performed in any order. In various methods, one skilled in the art will appreciate that additional processing steps may be added to the method 200 and that not all processing steps of the method 200 are necessarily performed in all embodiments.

In the tenth step 220 of the method 200, processed information security results of the processing steps 214, 216, and 218 are produced and published. The results may be provided to one or more customers that are using the operating system event and data access monitoring method of the present teaching. The results may be presented in a graphical user interface on a machine that is connected to system. The results may be made available through a web interface. The results may also be published in report form. The reports may be made available publicly in various public security forums.

One feature of the operating system event and data access monitoring system and method of the present teaching is that it monitors events generated at the kernel level of the operating system utilized by the elements 152 (FIG. 1B) of the present teaching. It is well known in the art that the operating system kernel is the central core of a computer's operating system. The kernel mediates access to the computer central processor, memory and input-output (I/O), and generally has complete control over all actions taken by the system. The kernel may also manage communication between processes. The kernel loads ahead of all other programs, and manages the entire startup and I/O requests from all software applications that run on the kernel. As such, the monitoring the kernel provides insight into all higher-level activities of the information system that are running on the operating system.

Prior art monitoring system use information derived from the Linux kernel audit framework. One reason that the Linux kernel audit framework is used for prior art systems is that using the Linux kernel audit framework does not require a kernel module. However, the Linux kernel audit framework "auditd" daemon available to Linux users is difficult to configure and is often very inefficient in processing events. This leads to significant degradation in system performance. As such, it is too difficult for users to interact directly with the Linux kernel audit framework.

In contrast, systems and methods of the present teaching utilize an agent that interacts with the kernel audit framework for event tracking, and automates the event information collection. Software agents are well-known in the art. In some embodiments, the software agent of the present teaching comprises software that operates autonomously on behalf of the operating system event and data access monitoring system to perform specific tasks or functions and to communicate resulting data to other software applications or processes within the system. An agent uses the least amount of system resources possible and runs in user space. In addition, an agent can run across multiple Linux distributions, which simplifies management. Furthermore, agents can be upgraded to newer versions without the significant operational overhead required to upgrade a kernel module. Furthermore, agents avoid the system instabilities that can occur in prior art event monitors that run as a kernel module.

Referring back to the system block diagram that implements the high-level process flow diagram described in connection with FIG. 1B, the agent of the present teaching comprises a state machine processor running in the application space of the elements 152. The agent obtains kernel events from the processes and/or machines 152. Multiple kernel events are combined by the agent into a structured event payload that has a pre-defined format. The agent sends the structured event payloads to the backend processing ingress, ingestion processor 157 described in connection with FIG. 1B.

In some embodiments, the agent resides both at the elements 152 and at the pipeline processing 160. In these embodiments, the agent attaches metadata to network connection events to determine where the connection is originating from and where it is going. The agent at the backend pipeline processing 160 is then able to correlate these network events to determine the originating process and potential user activity that caused that network event. This is an advantage of the agent residing on both the source and destination server. This automates tracking of network connections across multiple hosts when trying to connect across boxes. The metadata is especially useful for tracking SSH sessions across an environment and debugging what servers are speaking to one another and why.

Known kernel-based event monitor systems, also called audit systems, do not provide logs that are simple to search. Furthermore, known kernel-based event monitor systems do not support automatically finding the collection agent and the particular session associated with a user. Instead, known kernel audit systems produce a hex encoded string representing the connection address in the traditional auditd logs. In addition, known kernel audit system provide events and information that is not relevant and difficult for a human reader to parse. The agent of the operating system event and data access monitoring system and method of the present teaching stores events, activity, and commands associated with a logged in user to the structured event payload. The agent then automatically reconstructs the structured event payload to present the information into a clean, compact, searchable and readable timeline.

Prior art systems utilize the user daemon 'auditd' to collect and consume event data. However, there are many undesirable features associated with traditional open source auditd and auditd libraries, especially when running on performance-sensitive systems. For example, it is particularly difficult to rapidly obtain useful data from traditional open source auditd and auditd libraries. As such, the system and method of the present teaching uses a custom audit listener within the agent. The listener obtains files and metabolic profiles based on user preferences.

Figure 3:
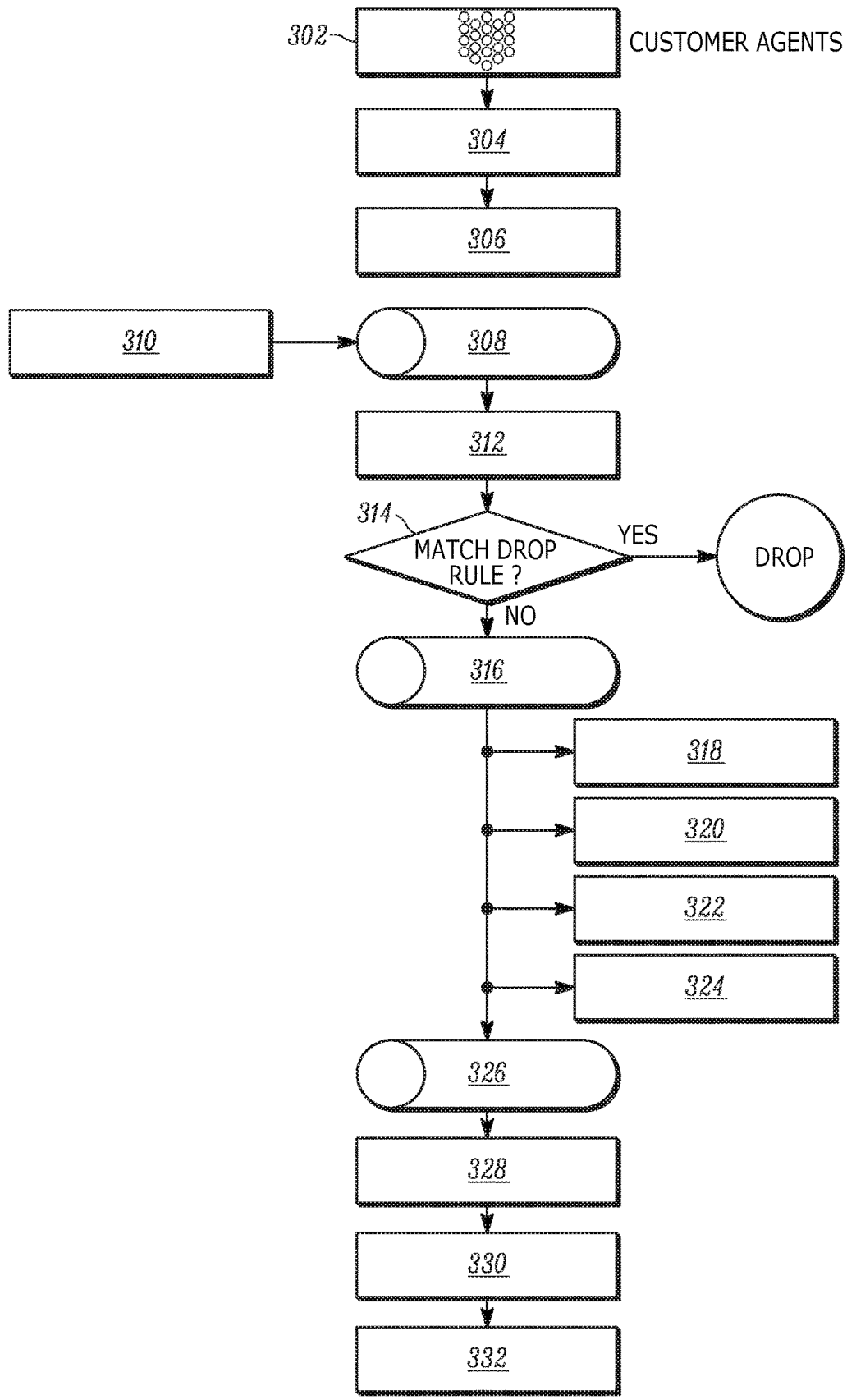
FIG. 3 illustrates a process flow diagram of an embodiment of an operating system event and data access monitoring system and method of the present teaching that utilizes agents distributed in a cloud.

FIG. 3 illustrates a process flow diagram 300 of an embodiment of the operating system event and data access monitoring system and method of the present teaching that utilizes agents distributed in the cloud. A plurality of customer agents are located proximate to the plurality of customers' cloud based elements that constitute information systems for these customers. In some embodiments, the plurality of customers' cloud based elements that constitute information systems for these customers are provided by Amazon™ using the so-called Amazon Web Services (AWS) Cloud.

A first step in the process 302 includes collecting event information from the information system services being used by the plurality of customers with a plurality of distributed customer agents. A second step 304 includes distributing the various customer agent's connections to an agent listener 306 based on a hash of the last octet of the IP Address of each customer agent with a load balancer. The third step of the process 306 includes authenticating and managing agent state for all customer agents with listener registers. The agent listener receives all customer agent communications and sends commands to the customer agents.

In a fourth step 308, the agent listener sends all data received from the customer agents to an ingestion queue. In a fifth step 310, the ingestion queue receives input from a service that records API calls for the cloud-based information system. In some embodiments, the service that records API calls is AWS CloudTrail. AWS CloudTrail records the identity of the API caller, the time of the API call, the source IP Address of the API caller, the request parameters, and the response elements returned by the AWS service.

In a sixth step 312, the ingestion queue sends queued data to a validation process that validates data, normalizes data when appropriate, and enriches data with additional information. In a seventh step 314, a drop process executes rules to exclude data that matches certain criteria from flowing further down the processing pipeline. Data is dropped that does not match predetermined criteria. In an eighth step 316, the remaining data, which was not dropped from the drop process executed in the seventh step 314, is provided to the next queue that feeds a pipeline processing stage.

In a ninth step 318, the queue flows data to a processing stage that compares IP addresses associated with an event to a database of known bad IP addresses. Matches are flagged, with what is described herein to be an intelligence event marker, and continue with the data down the pipeline processing. In a tenth step 320, events are analyzed to ensure they conform to a pre-defined data standard. The data are inserted into a search engine repository for searching and retrieval by users, customers, and other processes.

The data then continues to flow down the processing pipeline, where in an eleventh step 322, batches of event messages are retried for processing at a predetermined interval and then stored into data tables for aggregated event counts to power a user interface. For example, the predetermined interval can be 10 minutes. The data then continues to flow down the processing pipeline where, in a twelfth step 324, transform events capture login/logout and process connection events. The transform events are formatted appropriately and inserted into a database. In some embodiments, the database uses an Apache Cassandra open-source database management system. In some embodiments, the format is suitable for time-series and pseudo-graph data.

The data then continues to flow down the processing pipeline, where in a thirteenth step 326, an alert intake queue provides the data to an intake process. In a fourteenth step 328, the intake process evaluates all events against alert rules to create notifications. The intake process determines if an alert should be created based on time window and frequency thresholds. The intake process generates alerts that it determines should be created and sends them to an alert writer process. In a fifteenth step 330, the alert writer process determines if the generated alerts should be suppressed based on system and user criteria. The alert writer process writes alerts to primary data store for further processing and for availability at a user interface. The alert writer passes the alerts to a notification process.

In a sixteenth step 332, the notification process manages additional notification options based on customer preferences. The notification process sends notifications to various information system management and operations tool sets. In some embodiments, the notification process supports integration of notifications with PagerDuty, which is an incident resolution platform. In other embodiments, the notification process supports integration of notifications with Slack, which is a real-time communications platform. In other embodiments, the notification process sends notifications to a custom URL endpoint designated by a customer or end user.

One feature of the operating system event and data access monitoring system and method of the present teaching is that it can operate using containerization systems that are recently becoming widely used in cloud information systems. A recent trend in workload management for cloud-based information systems is to encapsulate software into containers. The containers are designed to contain only the base software necessary to execute a particular process or application. Containers virtualize access to resources, such as CPU, storage or memory. Containers differ from traditional virtualization technology in that they focused on providing a fully-encapsulated environment that is easy to manage for the execution of specific software, process or applications.

Some embodiments of the present teaching use the known Docker system for containerization. Docker system containers execute on a Docker host which provides the baseline Linux operating system and related libraries. Docker containerization builds upon existing Linux capabilities of process management and isolation. Thus, a process that executes within a Docker container has the same process information and metadata as a process executing in user-space. Additionally, Docker containerization provides a series of APIs that allow interrogation of containers and processes to obtain metadata about the state of the containers and the processes running within them. It should be understood that while some aspects of the present teaching describes the use of Docker containerization, one skilled in the art will appreciate that the present teaching is not limited to containerization systems using Docker, and that numerous other containerization schemes can be utilized.

In some embodiments, the system and method of the present teaching obtains events and metadata about other processes executing in user space. In some embodiments, the system and method of the present teaching obtains events and metadata about other process executing on available Docker application programming interfaces (APIs). The agent then transforms the obtained events and metadata into a structured event payload. In order to do this at scale, the agent obtains and manages information from Docker containers, and, in particular, works with the Docker container lifecycle to obtain events in near-real time in a compute and memory efficient manner.

More specifically, the agent determines the number of containers running on a Docker host and uniquely identifies them. The agent also determines when new containers are executed and older containers have been terminated, and are thus aged out of the system. The agent builds an internal cache of such information to avoid repeated polling of the Docker API, which would lead to undesirably high CPU utilization. The agent then obtains information about file systems that the Docker container processes might trigger. The agent then combines the information on the uniquely identified containers and their lifecycle, together with the file system information into a pre-defined audit event. The agent then bundles the pre-defined audit event into a structured event payload and transmits the event to the post processing system for analysis, correlation, display and process for rules-based alerting.

In some embodiments, containerization capabilities are delivered in a separate containerization-capable module of the agent. In these embodiments, only customers that opt-into this feature are provided with containerization capabilities. For example, in some embodiments, the containerization-capable module of the agent runs on versions of Docker 0.8 and greater. Also, in some embodiments, the containerization-capable module runs on UbuntuCore, Ubuntu, and CoreOS operating systems, which are common to Docker deployments.

Figure 4:
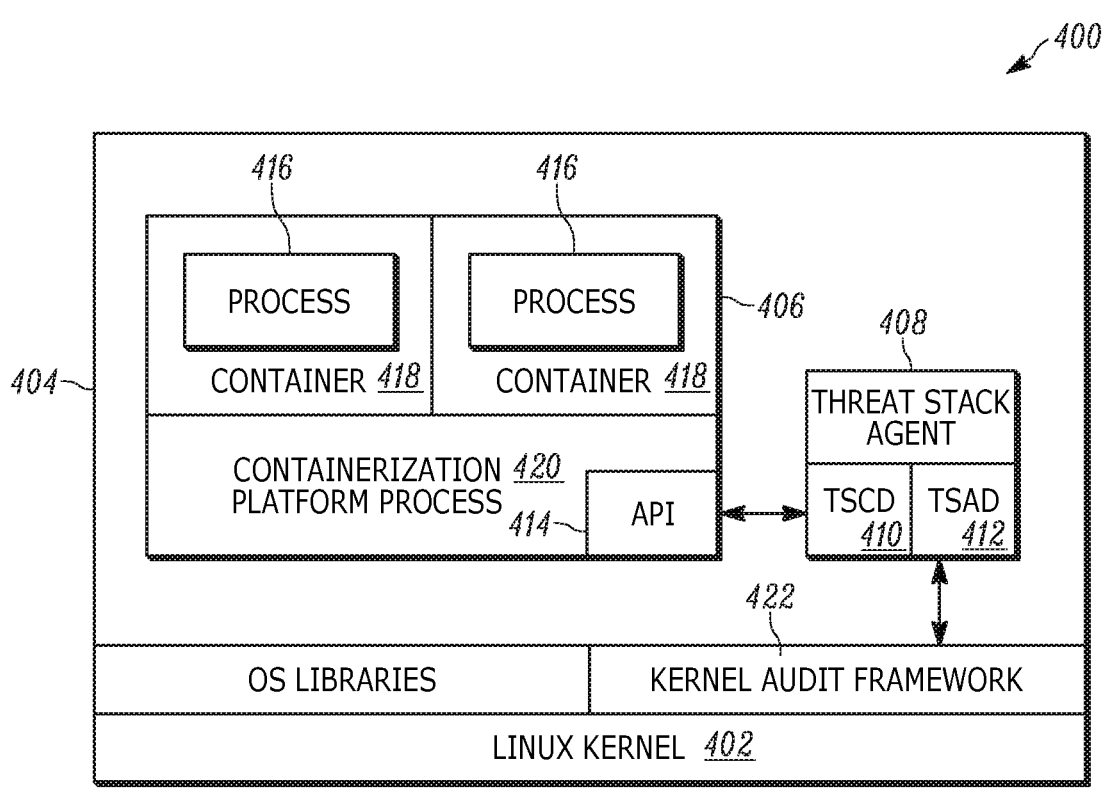
FIG. 4 illustrates an architecture diagram of an embodiment of the agent-based system and method of the present teaching utilizing a containerization platform to obtain events and metadata from a kernel operating system.

FIG. 4 illustrates an architecture diagram 400 of the agent-based system and method of the present teaching utilizing a containerization platform that obtains events and metadata from a kernel operating system. The kernel 402 of the operating system for the embodiment illustrated in FIG. 4 is a Linux kernel. The kernel 402 supports an application and userspace 404. A containerization platform 406 runs in the application and userspace 404. An agent 408 also runs in the application and userspace. In the embodiment shown in FIG. 4, the agent comprises a containerization-capable audit module 410, and a kernel audit module 412. The containerization-capable audit module 410 of the agent 408 makes calls on an API 414 of the containerization platform 406. The containerization platform 406 supports various containers 418 that contain various processes 416. A containerization platform process 420 provides various process information and additional identification information about various containers 418 and processes 416. The information that is made available through the API 414. The kernel audit module 412 of the agent 408 can also obtain events and metadata from the kernel audit framework 422 that runs over the kernel 402.

One feature of the operating system event and data access monitoring method of the present teaching is that it can monitor a cloud-based information system based on either a particular process, a particular machine that is running the process, or both. It is well known in the art that cloud computing and cloud-based services, refers to a system and a method of computation and providing services that utilizes shared computing resources. For purposes of this disclosure, a machine or a processor is a hardware-based computing resource and, a process, application or service is a software-based process. In cloud-based information systems, the shared computing resources comprise computers, processors, and storage resources that are connected together using the Internet. Various applications, or processes, that provide various services run in software using the shared resources. The various processes may be migrated to run over various computing resources over time. As a result, processes may be associated with multiple machines over the lifetime of the process. In many cases, an operating system together with all the applications and processes running over the operating system are migrated to different machines. As such, an important feature of the operating system event and data access monitoring method of the present teaching is that the collection of the event information may be tied to a particular application, service or process, and maintain that collection during migrations. In some embodiments, the collection of event information is tied to a particular operating system instance and will migrate as that operating system is migrated around in the cloud. In some embodiments, the collection of the event information may be tied to a particular shared resource.

The operating system event and data access monitoring method of the present teaching is capable of monitoring systems that utilize virtual machines. Virtual machines emulate the functions of a computer resource. In some embodiments, the virtual machines that run the processes, application and services of the present teaching execute a full operating system, most often Linux. In some embodiments, the processes, application and services of the present teaching run on virtual machines provided at the kernel of a common operating system that provides isolated userspaces, which are sometimes called containers, which run processes. In these systems, the containers operate as separate machines and share a common operating system.

Figure 5:
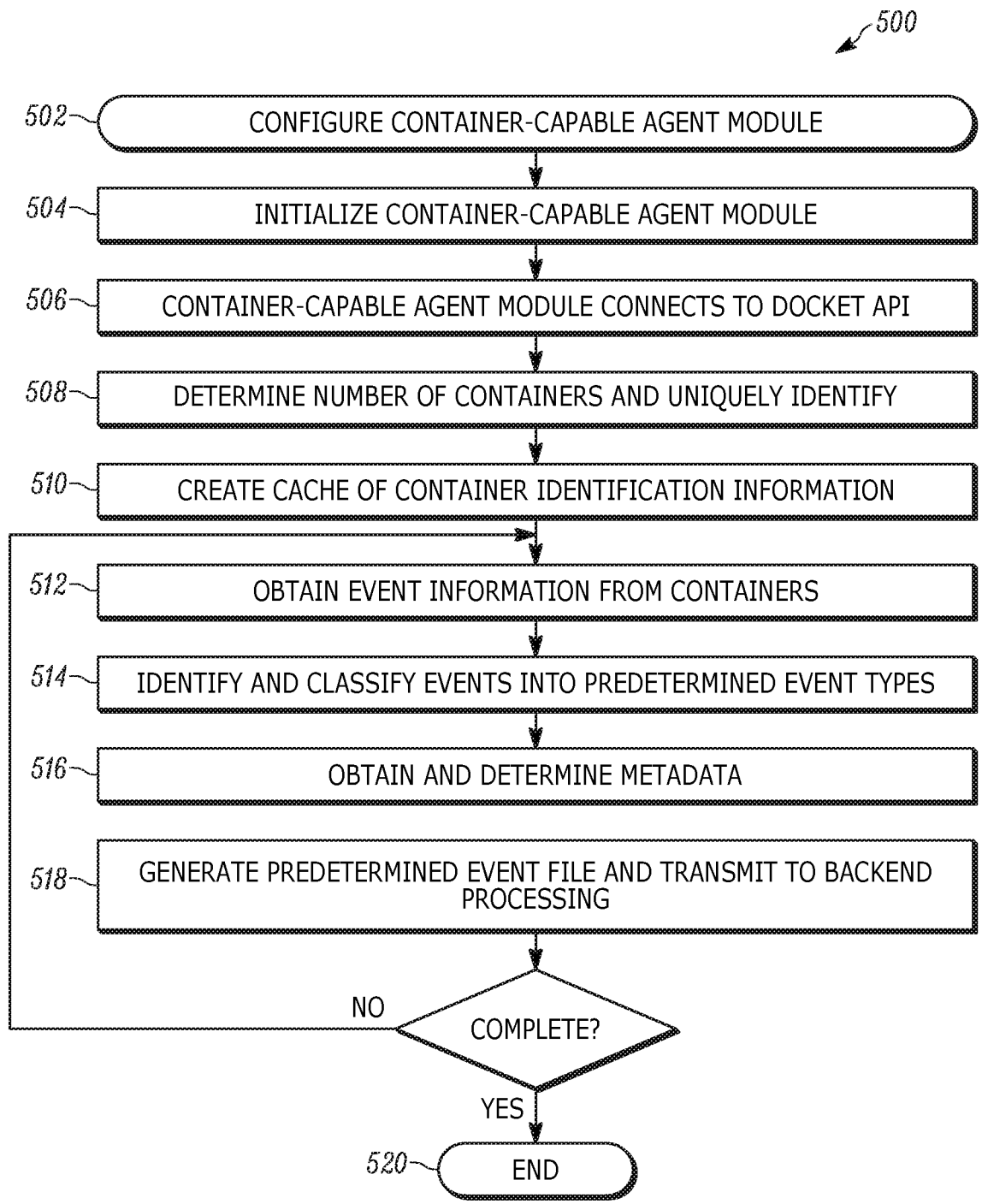
FIG. 5 illustrates a process flow diagram of a method of the generation of a structured event payload using a containerization platform of the present teaching.

FIG. 5 illustrates a process flow diagram of a method 500 of the generation of a structured event payload using a containerization platform of the present teaching. In a first step 502 of the method 500, the collection of container process events is configured. In the second step 504, the container-capable agent module is initialized. In some embodiments, initiating the collection of container process events comprises setting a configuration flag on the agent and then restarting the agent. The configuration is persisted to disk. Upon restart of the agent, the container-capable agent module initializes. In the third step 506, the module connects to the containerization platform API. In the fourth step 508, the container-capable agent module determines the number of containers and uniquely identifies them. In one particular embodiment, the third step 506 of the method 500 comprises connecting to a Docker socket at /var/run/docker.sock. In embodiments where the API is the Docker socket, upon successfully connecting to that socket, the fourth step 508 comprises obtaining a JSON-formatted configuration file located at /var/lib/docker/containers/ to determine the number of containers running and begin to obtain container information.

In a fifth step 510 of the method 500, a cache is created that comprises information on the number of containers, and the unique identifying information. The fifth step 510 advantageously avoids having to repeatedly poll the containerization platform. In some embodiments, the agent iterates over the list of Docker containers and calls the Docker REST "GET /containers/" API to obtain information about the container.

In a sixth step 512 of the method 500, event information which comprises events and event information related to the processes running in the container, is obtained. In the sixth step, the associated user information can also be obtained. In some embodiments, a call is made to /top to obtain information about all of the processes running within the container to obtain their human readable name, process ID (PID) and user ID associated with that process.

The seventh step 514 of the method 500 is to identify and to classify events into predetermined event types. In some embodiments of seventh step 514, a mapping is performed of the PID from Docker to the kernel PID to be able to concretely identify that process and to ensure that it has a unique PD.

In an eighth step 516 of the method 500, additional metadata about the events is obtained and/or determined. In some embodiments, the eighth step 516 comprises the agent making a call to /json to obtain additional information about the container itself, which can, for example, include container name and ID. This information is used in post processing to allow the user to identify the Docker container for a given process event.

In a ninth step 518 of the method 500, structured event payloads are generated and then transmitted to backend processing by the agent. In some embodiments, the structured event payloads comprise a pre-defined format that is based on grouping pre-defined event types. In some embodiments, the file is sent from the containerization-capable module to the main agent code for validation and transmission to the backend processing. The process flow of the method 500 then repeats from the sixth six 512 until the monitoring is complete. After the monitoring is complete, the method ends at the tenth step 520.

The operating system event and data access monitoring system and method of the present teaching advantageously provides both real-time and historical analysis of activity in a monitored information system. The resulting synthesized data protects and accounts for passwords, credentials, intellectual property and customer data that are moving around a cloud-based information system. In some embodiments, specific user and process activities of the information system are searched and analyzed to determine trends. In some embodiments, real time visibility and detailed audit trails of actions within the information systems provide a historical record necessary to meet particular compliance regulations such as HIPAA, PCI DSS, SOC 2, ISO 27001 and SOX 404.

Figure 6A:
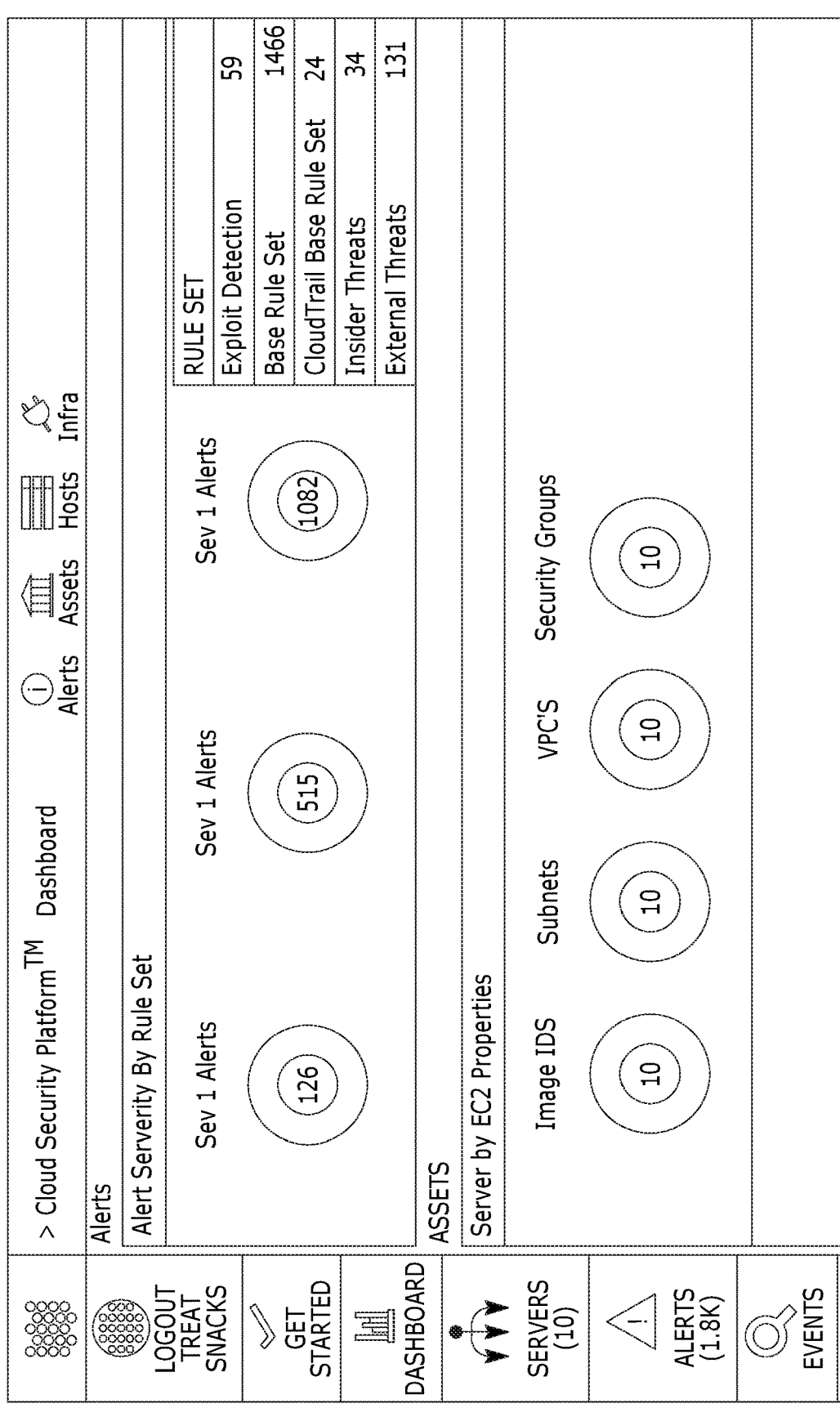

FIGS. 6A and 6B illustrates an embodiment of a graphical user interface (GUI) 600 presenting processed information security results provided by the operating system event and data access monitoring system and method of the present teaching. The system and method provides fully processed and organized information to the information system administrators and other users of the system being monitored. The Graphical User Interface (GUI) 600 supports the ability to call up and dismiss alerts using built-in or custom rules. The GUI 600 provides and archives all dismissed alters and an audit trail of when and by whom alerts were checked. The GUI 600 can be used to call up various system activity information including: scanning activity, abnormal login attempts/failures, wide open security groups, launch of new processes or kernel modules, user session information, process stops, external connections for command and control, and user session information. The system also automatically recognizes activities including escalation of user privileges, unauthorized installs, new users added/deleted, suspicious commands, changes to security groups, user session information, and process stops.

One feature of the operating system event and data access monitoring system and method of the present teaching is that it provides rapid and simple identification of changes in user, process, and file behaviors. In some embodiments, the system continuously monitors and tracks workloads. In these embodiments, the system can be used to recognize when activities deviate from normal. Workloads are groups of one or more applications, processes, and services that run routinely on an information system. Tracking workloads has several benefits over traditional signature-based recognition systems. One of these benefits is that it provides better protection against new and unknown threats. Another of these benefits is that it helps to identify internal threats whether they are malicious or accidental in nature.

Examples of common threat indicators that are identified in various embodiments of the operating system event and data access monitoring system and method of the present teaching include: (1) use of commands like sudo/scp/curl/wget; (2) users copying files onto another machine; (3) new user login sessions; (4) initiation of new and unauthorized processes, services and workloads; (5) new external connections; (6) changes to important files; and (7) connections with known list of "Bad IPs". In various embodiments, the system supports detailed investigations into common activities associated with data leaks, including: (1) understanding how a user escalated or changed their privileges to root; (2) investigating all running commands for all users; (3) tracing user logins across multiple machines; (4) debugging why a service crashed; and (5) understanding why a service is executing a specific process.

In various embodiments, real-time visibility and detailed audit trails provide, for example: (1) compliance for HIPAA, PCI DSS, SOC 2, ISO 27001 and SOX 404 regulations; (2) internal control and process verification; and (3) knowledge that important files remain protected. The system also monitors for vulnerabilities and software patches.

One feature of the operating system event and data access monitoring system and method of the present teaching is the ability to support PCI DSS compliance. For organizations that store, process or transmit credit card data, meeting PCI DSS compliance regulations means having the right controls, policies and procedures in place for the information systems that provide these capabilities. The system often need to continuously monitor and provide visibility into cardholder-data movements and application activity in the cloud. This is because the system monitors not only at the kernel level, but also at key points in the communications of critical cardholder data during transactions.

One feature of the operating system event and data access monitoring system and method of the present teaching is that it supports prevention of unauthorized data, configurations and activity changes or exposure within areas of high risk. The system also notifies of information system known cyber-attacks, including those documented by the Open Web Application Security Project (OWASP), the SANS Institute, the United States Computer Emergency Readiness Team (CERT), and various other organizations.

Another feature of the operating system event and data access monitoring system and method of the present teaching is that it can compile audit logs that can help identify when a file with cardholder data is accessed, as well as which process or user accessed it. Thus, the system provides visibility into security configurations and control effectiveness that can be used to improve testing processes.

Another feature of the operating system event and data access monitoring system and method of the present teaching is the ability to support Service Organization Control 2 (SOC 2) reporting. Service providers that store and handle large amounts of their customer's data must minimize risk and exposure to this customer data. Inadequate security controls create significant risks to both the service provider and their customers. The American Institute of CPAs (AICPA) requires all service providers who handle customer data, whether at rest or in transit, comply with SOC 2 requirements. These compliance regulations bring confidentiality and security measures in line with current cloud security concerns, and cover the security, availability, processing integrity and confidentiality of a service provider's customer data.

Service Organization Control 2 compliance necessitates monitoring of controls, user access and changes to data that may indicate a compromise. Threats that may impair system security, availability, processing integrity or confidentiality can be identified with the system and method of the present teaching. In addition, unauthorized exposure or modification of data can be identified and responded immediately. Also, audit logs that detail system activities are provided that are useful in post-incident analysis.

Another feature of the operating system event and data access monitoring system and method of the present teaching is the ability to manage healthcare records and services securely and compliantly using the cloud. Healthcare regulations require that healthcare businesses know who is accessing and sharing what data, where and when. There is also a requirement to identify and verify threats and keep Personal Health Information (PHI) secure. The Health Insurance Portability and Accountability Act (HIPAA) protects the privacy and security of highly sensitive patient data through specific compliance regulations. Health Insurance Portability and Accountability compliance features enabled by the system and method of the present teaching includes monitoring of cloud activity, including suspicious file system, account and configuration activity. The system provides alerts about changes to or exposure of data or tampering with encryption algorithms, applications, or keys, that allow for immediate responses. For example, the system can notify upon violations of policies and/or procedures and track exactly who is accessing what data and/or what process. The system also provides detailed reports about system activity so to allow system managers to make informed decisions about how to respond.

EQUIVALENTS

While the Applicant's teaching is described in conjunction with various embodiments, it is not intended that the Applicant's teaching be limited to such embodiments. On the contrary, the Applicant's teaching encompass various alternatives, modifications, and equivalents, as will be appreciated by those of skill in the art, which may be made therein without departing from the spirit and scope of the teaching.

We claim:

1. A non-transitory computer readable medium having stored thereon instructions comprising executable code that, when executed by one or more processors, causes the one or more processors to:
   collect event information from cloud-based information system services running on at least one container using an agent, wherein the collected event information comprises at least one of a container name or a container IDS associated with a monitored process;
   uniquely identify by the agent of the at least one container associated with the cloud-based information system services;
   poll by the agent an application programming interface (API) to collect container lifecycle information associated with the cloud-based information system services;
   build a cache of the collected container lifecycle information in the agent, thereby avoiding repeated polling of the API;
   generate one or more structured event payloads based on the collected event information and the container lifecycle information;
   produce a time-sequenced ordered event stream from the generated one or more structured event payloads using the container lifecycle information;
   compare IP addresses in the time-sequenced ordered event stream with known bad IP addresses and generating an intelligence event marker when there is a match;
   evaluate data in the time-sequenced ordered event stream against a predetermined rule to determine an information system incident; and
   resolve the determined information system incident.

2. The non-transitory computer readable medium of claim 1 wherein the agent comprises an agent running on a container.

3. The non-transitory computer readable medium of claim 1 wherein the at least one container comprises a Docker container.

4. The non-transitory computer readable medium of claim 1 wherein the container lifecycle information comprises a timestamp.

5. The non-transitory computer readable medium of claim 1 wherein the executable code, when executed by the one or more processors further causes the one or more processors to connect through a load balancer the agent to an agent listener using a code associated with the agent.

6. The non-transitory computer readable medium of claim 1 wherein the executable code, when executed by the one or more processors further causes the one or more processors to drop event data that does not match predetermined criteria.

7. The non-transitory computer readable medium of claim 1 wherein for the resolve the determined information system incident, the executable code, when executed by the one or more processors further causes the one or more processors to resolve using an incident resolution platform.

8. The non-transitory computer readable medium of claim 1 wherein for the poll by the agent the application programming interface (API), the executable code, when executed by the one or more processors further causes the one or more processors to poll a Docker API.

9. The non-transitory computer readable medium of claim 1 wherein the cloud-based element comprises a cloud-based process.

10. The non-transitory computer readable medium of claim 1 wherein for the generate one or more structured event payloads, the executable code, when executed by the one or more processors further causes the one or more processors to at least one of:
    generate a time-stamped collection of events obtained from the collected event information;
    generate one or more structured event payloads, the executable code, when executed by the one or more processors further causes the one or more processors to group related event types together in real time; or
    attach metadata to generate a searchable structured event payload.

11. A computing device, comprising memory comprising programmed instructions stored thereon and one or more processors configured to be capable of executing the stored programmed instructions to:

collect event information from cloud-based information system services running on at least one container using an agent, wherein the collected event information comprises at least one of a container name or a container IDS associated with a monitored process;

uniquely identify by the agent of the at least one container associated with the cloud-based information system services;

poll by the agent an application programming interface (API) to collect container lifecycle information associated with the cloud-based information system services;

build a cache of the collected container lifecycle information in the agent, thereby avoiding repeated polling of the API;

generate one or more structured event payloads based on the collected event information and the container lifecycle information;

produce a time-sequenced ordered event stream from the generated one or more structured event payloads using the container lifecycle information;

compare IP addresses in the time-sequenced ordered event stream with known bad IP addresses and generating an intelligence event marker when there is a match;

evaluate data in the time-sequenced ordered event stream against a predetermined rule to determine an information system incident; and resolve the determined information system incident.

12. The computing device of claim 11 wherein the agent comprises an agent running on a container.

13. The computing device of claim 11 wherein the at least one container comprises a Docker container.

14. The computing device of claim 11 wherein the container lifecycle information comprises a timestamp.

15. The computing device of claim 11 wherein the one or more processors are further configured to be capable of executing the stored programmed instructions to connect through a load balancer the agent to an agent listener using a code associated with the agent.

16. The computing device of claim 11 wherein the one or more processors are further configured to be capable of executing the stored programmed instructions to drop event data that does not match predetermined criteria.

17. The computing device of claim 11 wherein for the resolve the determined information system incident, the one or more processors are further configured to be capable of executing the stored programmed instructions to resolve using an incident resolution platform.

18. The computing device of claim 11 wherein for the poll by the agent the application programming interface (API), the one or more processors are further configured to be capable of executing the stored programmed instructions to poll a Docker API.

19. The computing device of claim 11 wherein the cloud-based element comprises a cloud-based process.

20. The computing device of claim 11 wherein for the generate one or more structured event payloads, the one or more processors are further configured to be capable of executing the stored programmed instructions to at least one of:

generate a time-stamped collection of events obtained from the collected event information;

generate one or more structured event payloads, the executable code, when executed by the one or more processors further causes the one or more processors to group related event types together in real time; or attach metadata to generate a searchable structured event payload.

* * * * *